Dec. 29, 1942.   C. D. PETERSON ET AL   2,306,561
TRANSMISSION GEARING
Filed Dec. 21, 1939   2 Sheets-Sheet 1
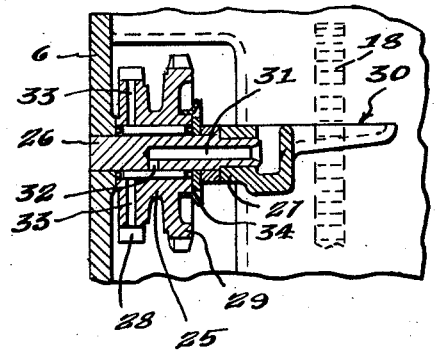
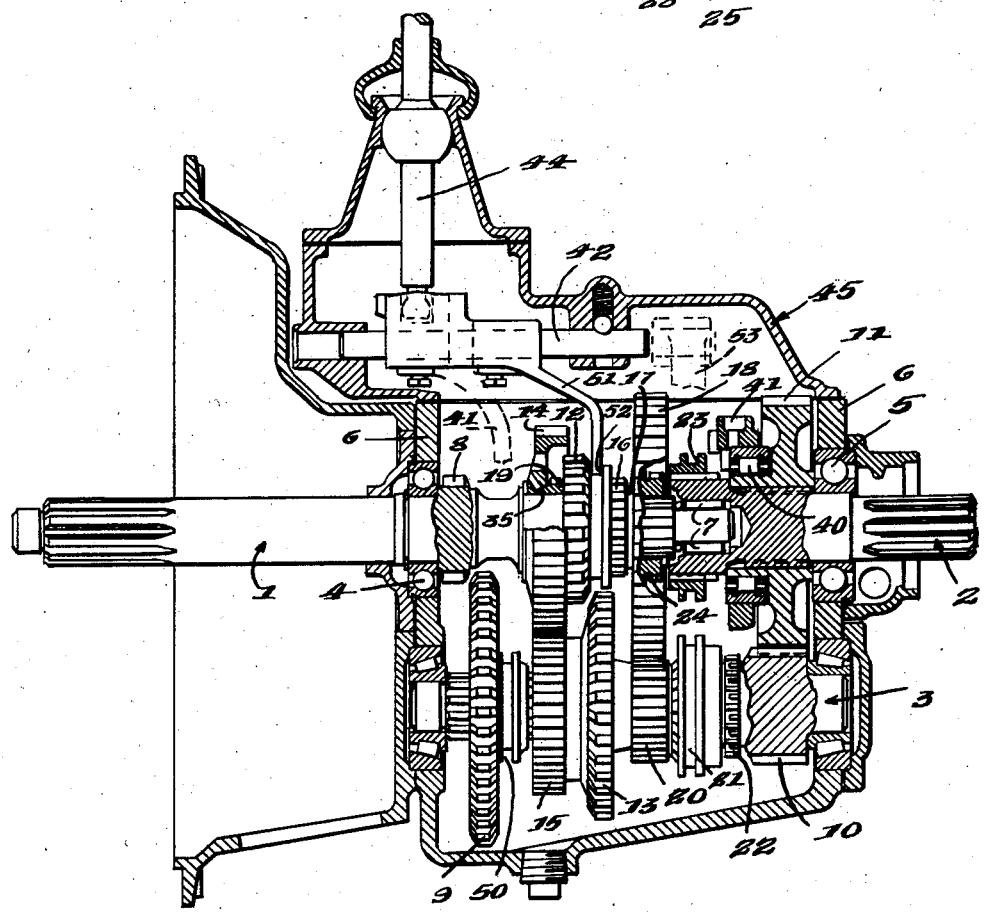
INVENTORS
Carl D. Peterson, Elmer J. Barth
BY Bodell & Thompson
ATTORNEYS.

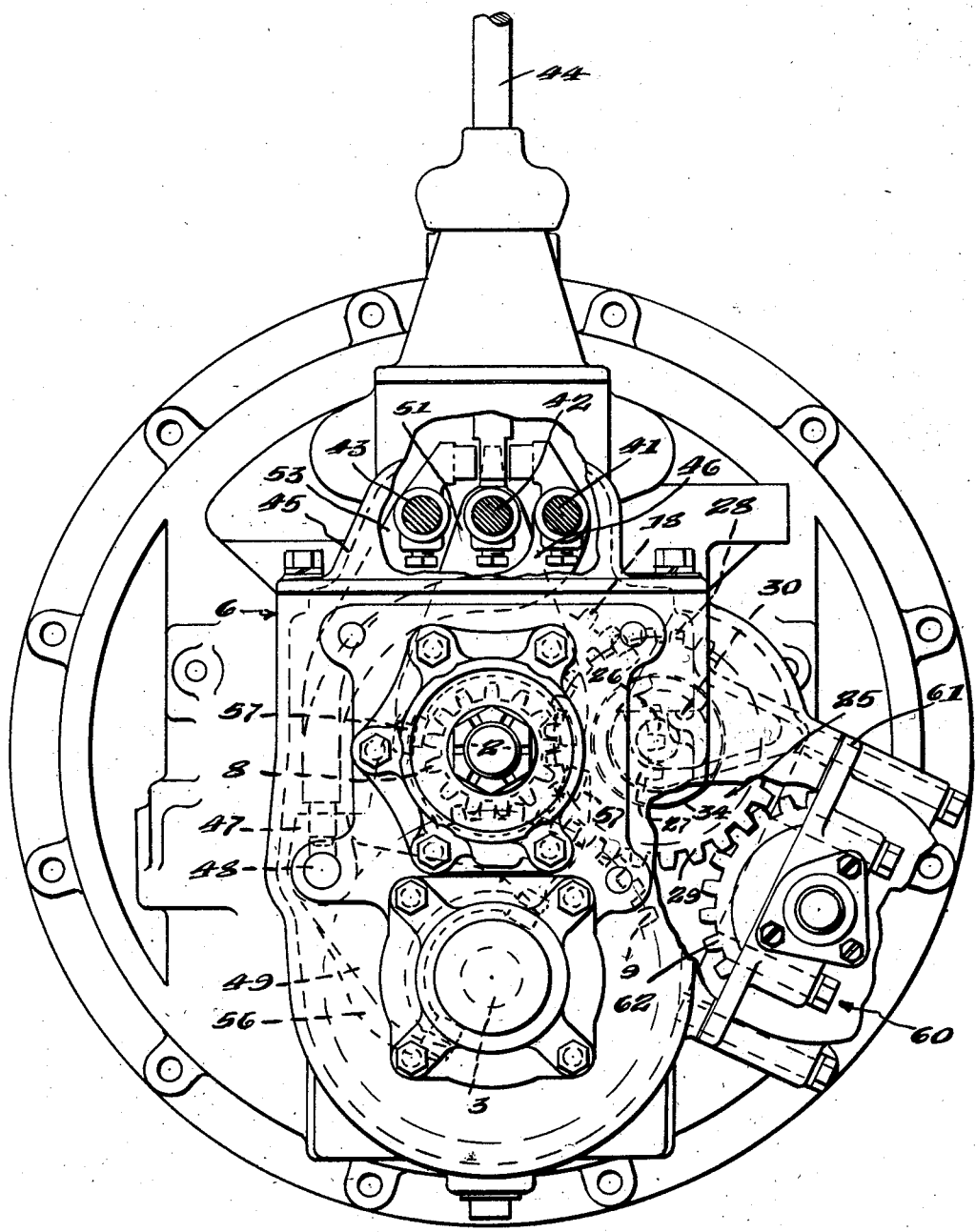

Patented Dec. 29, 1942

2,306,561

UNITED STATES PATENT OFFICE 2,306,561

TRANSMISSION GEARING

Carl D. Peterson and Elmer J. Barth, Toledo, Ohio, assignors to Spicer Manufacturing Corporation, Toledo, Ohio, a corporation of Virginia Application December 21, 1939, Serial No. 310,303

3 Claims. (Cl. 74—333)

This invention relates to change speed transmission gearing. It has for its object a particularly compact construction, whereby a maximum number of gear changes may be provided for within a given axial length.

It also has for its object a reverse gear train including an idler spool, which meshes directly with a gear on the input shaft, which is also the drive gear of one of the forward gear trains, and it also delivers the power to the output shaft through a gear on the countershaft, which is also one of the gears of a forward gear train, which gear is shiftable in opposite directions from neutral on the counter shaft into mesh with the gear on the input shaft and in the opposite direction, into mesh with the idler.

It further has for its object a gearing in which at least one of the trains of change speed gears between the input and countershafts includes a gear rotatable with the input shaft and a gear normally rotatable about the countershaft and clutchable thereto, so that when the transmission gear is in neutral position, the vehicle stationary and the countershaft idle, the train of gears acts to carry the oil from the sump in the bottom of the gear box to parts in motion when the transmission is in neutral, the vehicle stationary, and the engine running, which parts are in motion when a power take-off is being used.

It further has for its object an arrangement of final drive train between the countershaft and the output shaft and particularly to lubricating a bearing for the output shaft on the inner side of the final drive gear on the output shaft.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a central longitudinal sectional view of this gearing, partly in elevation, and partly broken away.

Figure 2 is an end view of parts seen in Figure 1.

Figure 3 is a detail view of the reverse idler spool and adjacent parts.

1 designates the input shaft; 2 the output shaft; 3 the countershaft. The input and output shafts 1, 2 are mounted in bearings 4 and 5 in opposite end walls of the gear box 6 and also one has a pilot bearing at 7 in the other. The countershaft is also mounted in suitable bearings in the end walls of the gear box. The bottom portion of the gear box serves as an oil sump.

The gearing here illustrated produces five speeds forward and reverse, and is similar to the gearing described in our pending application, Serial No. 300,686, filed October 23, 1939, one exception being the countershaft is not dead when the input and output shafts are not clutched together in a direct drive relation.

One of the features of this invention is a reverse gearing which takes its power directly from the input shaft 1 instead of from a gear on the countershaft. The driving of the reverse idler off the low speed input shaft possesses a great advantage over designs in which the reverse idler spool is driven off a gear on the countershaft, for the reason that the pitch line velocity of the reverse idler spool is greatly reduced. When driven from the countershaft, it is driven from a comparatively large gear on the countershaft, and the speed of this gear on the countershaft is stepped up, due to the ratio set up between the output shaft and the countershaft through the final drive train of gears.

The trains of change speed gears between the input shaft 1 and countershaft 3 are as follows:

First speed is obtained through gears 8 and 9 on the input shaft 1 and countershaft 3 respectively, gear 9 being splined on the countershaft and normally out of mesh with the gear 8 and shiftable axially in one direction, as to the left from neutral, into mesh with the gear 8, so that the torque of the power shaft 1 is transmitted through the gears 8, 9, countershaft 3, final drive train of gears 10 and 11 on the countershaft 3 and output shaft 2 respectively, these being splined to these shafts.

The gear 9 is also shiftable in the opposite direction, to the right from neutral, to produce reverse speed, as will be presently described.

Second speed forward is effected through gears 12 and 13 on the input shaft 1 and countershaft 3 respectively, and third speed forward, by gears 14 and 15 on the input shaft 1 and countershaft 3 respectively. The gears 13 and 15 are a unitary gearing splined to the countershaft 3. The gear 14 is normally rotatable about, or has a running fit on, the input shaft 1 and is clutchable thereto and normally unclutched therefrom. The gear 12 is arranged adjacent the gear 14 and is rotatable with the input shaft 1, it being here shown as splined at 16 to the hub 17 of the gear 18 splined to the input shaft 1. The gear 12 is normally out of mesh with its companion gear 13 on the countershaft 3 and is shiftable axially, as to the right from neutral position, into mesh with the gear 13 and is shiftable in the opposite direction from neutral, to the left, to clutch the gear 14 thereto, and hence to the input shaft 1, through clutch teeth 19 on the hub of the gear 14.

Fourth speed forward is obtained through the gear 18 splined to the input shaft 1 and gear 20 normally rotatable about or having a running fit on the countershaft 3, the gears 18 and 20 being permanently in mesh. The gear 20 is clutchable to the shaft 3 through a suitable clutch member 21 splined on the hub of the gear 20 and shiftable axially to the right from neutral into interlocking engagement with clutch teeth 22 on the hub of the gear 10 of the final drive train.

The train of gears 18, 20 serves to convey oil from the oil sump to a trough to be presently described, and thence to bearings between running parts which run when the transmission gear is in neutral position and the vehicle is stationary, and hence the countershaft idle, and particularly when the power takeoff is being used, which power takeoff is driven from the idler spool, as will be hereinafter described.

Fifth speed forward is a direct drive and is effected through a clutch section 23 splined on the output shaft 2 and shiftable axially to the left into interlocking engagement with clutch teeth 24 on the hub of the gear 18 which is splined to the input shaft 1.

The clutch sections 23 and 21 are operated by a double fork on the same shift rod, and the clutch section 23 idles to the right from neutral, when the clutch section 21 is shifted to the right into engagement with the clutch teeth 22. Likewise the clutch section 21 idles to the left when the clutch section 23 is shifted to the left to clutch the shafts 1, 2 together in direct drive relation.

25 designates the reverse idler spool, this being mounted on a spindle or stud 26 suitably mounted in one end wall of the gear box and in a bracket, as 27, one of the gears 28 of the spool permanently meshing with the gear 8 on the input shaft 1, and the other gear 29 of the spool being arranged to mesh with the first speed gear 9 on the countershaft, when the gear 9 is shifted to the right from neutral.

30 designates a trough provided on or formed on a side wall of the gear box in position to receive oil thrown by the gear 18 and picked up by the gear 18 from the gear 29, which dips into the oil in the oil sump and is running when the transmission gearing is in neutral. The oil accumulates in the trough and flows therefrom through an axial duct 31 in the spindle or stud 26 through radial ducts 32 to the running fit between the stud and the reverse idler spool 25 thence through additional radial ducts 33 in the gear 28 opening into spaces between some of the teeth thereof, where it is conducted or thrown to the bearing 4 for the input shaft 1. The gear 8 and spool 25 run adjacent the end wall of the gear box provided with the bearing 4. The end of the trough may enclose the end of the stud 26. The oil flows from the end of the trough onto a slinger device 34 on the end of the reverse spool 25 or on the side of the gear 29 thereof, which slinger throws the oil against the side of the gear 14 and through a duct 35 into the running fit or bearing between the gear 14 and the shaft 1. Thus, when the engine is running, the vehicle stationary, and the transmission gearing neutral, and hence the countershaft 3 dead, oil is conveyed from the oil sump to the bearings of any running parts in motion.

The output shaft 2 in addition to being journalled in the bearing 5 in the end wall of the gear box is also journalled in an end board bearing 40 spaced inwardly from the end wall in which the bearing 5 is located, the bearing 40 coacting with the hub of the gear 11. The cap 41 of this bearing is provided with an oil trap to collect the oil being splashed and distribute it to the bearing 40. These bearings need lubrication only when the vehicle is in motion. When the transmission is in neutral, and the vehicle idle, these bearings require no lubrication.

The gears 9, 12, clutch sections 21 and 23 are selectively operable to selectively connect any of the trains of gears in motion-transmitting relation with the output shaft 2 by suitable selecting and shifting mechanism.

The shifting mechanism here shown consists of shift rods 41, 42, 43, forks connected thereto, and a selecting and shifting lever 44 having a lateral selecting movement and a fore and aft shifting movement, the shift rods and the levers being mounted in the usual manner in the cover 45 of the gear box. 46 designates an arm connected to the shift rod 41, this coacting with a slide 47 on a guide rod 48 fixed in the gear box. the slide having a fork 49 coacting with a groove 50 in the hub of the gear 9. The shift rod 42 has a fork 51 coacting with a groove at 52 in the hub of the clutch gear 12. The shift rod 43 has an arm 53 coacting with the slide, similar to the slide 47, which also has a double fork 56, 57 coacting with grooves in the clutch sections 21 and 23 respectively. The selecting and shifting lever 44 has a lateral selecting movement to bring the finger at its lower end into selecting engagement when any one of the notches in blocks on the shift rods and a fore and aft movement to shift the selected shift rod in either direction from neutral. As the operation of the selecting and shifting lever and shift rods is well known, further description thereof is thought to be unnecessary.

60 designates one form of power take-off, this being applied to the gear box through a removable cover on one side of the gear box including a gear 62 which meshes with the gear, as 29, of the reverse idler spool 25. Hence, the power take-off idles at all times and may be used when the transmission gearing is in neutral position, and hence in this gearing, the parts that are running when the transmission is in neutral position are adequately lubricated, as hereinbefore described.

When the power take-off is not applied, a cover plate closes the opening in the gear box through which the power take-off may be applied, the cover plate corresponding to the base flange 61 of the power take-off.

Owing to the reverse idler spool being located to be driven from the input shaft without any step-up in torque, the reverse gear spool strains on the gear box are extremely low, and hence the reverse idler spool gear may be placed either on the right side or the left side of the transmission, as desired.

In transmissions heretofore used, it is practically necessary to put the reverse idler gear on the side of the case in which the gear loads cancel out, and if not so located, the gear boxes are loaded so high and subjected to such a severe strain that it is practically impossible to produce a gear case that will stand the strains. Hence by driving the reverse idler spool off at low speed main shaft instead of off the countershaft low speed gear, the reverse idler may be located anywhere without danger of straining the gear box.

What we claim is:

1. In a transmission gearing including input, output and countershafts, the input shaft and output shaft being arranged in axial alinement, selectively operable trains of gears between the input and countershafts, one of said trains of gears including a drive gear on the input shaft, a gear on the countershaft and normally out of mesh and shiftable axially into mesh therewith, an idler spool having a gear meshing with said drive gear on the input shaft and a gear meshing with said shiftable gear on the countershaft and being normally out of mesh therewith, a final drive train between the countershaft and the output shaft, and selecting and shifting mechanism operable to shift said gear on the countershaft in one direction from neutral into mesh with the drive gear on the input shaft and in the other direction from neutral into mesh with the gear of the idler spool.

2. In a transmission gearing including input, output and countershafts, the input and output shafts being arranged in axial alinement, selectively operable trains of gears between the input and countershafts, an idler spool for transmitting the motion from the input shaft to the countershaft through the gear on the countershaft of one of said trains of gears, said gear being shiftable in one direction from neutral into mesh with a gear on the input shaft with which the idler spool meshes and in the opposite direction from neutral into mesh with the idler spool, and a final drive train between the countershaft and the output shaft.

3. In a transmission gearing including input, output and countershafts, the input shaft and output shaft being arranged in axial alinement, selectively operable trains of gears between the input and countershafts, one of said trains of gears including a drive gear on the input shaft, a gear on the countershaft and normally out of mesh and shiftable axially into mesh therewith, an idler spool having a gear meshing with said drive gear on the input shaft and a gear meshing with said shiftable gear on the countershaft and being normally out of mesh therewith, a final drive train between the countershaft and the output shaft, and selecting and shifting mechanism operable to shift said gear on the countershaft in one direction from neutral into mesh with the drive gear on the input shaft and in the other direction from neutral into mesh with the gear of the idler spool, the idler spool being nonshiftable, and a power take off gear permanently meshing with one gear of the idler spool.

CARL D. PETERSON.
ELMER J. BARTH.